(12) United States Patent
Moran et al.

(10) Patent No.: US 6,185,542 B1
(45) Date of Patent: Feb. 6, 2001

(54) COMMUNICATION OF TRANSACTION DATA VIA THE INTERNET

(75) Inventors: John C. Moran, Thornton; Georgene M. Nielsen, Westminster, both of CO (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/127,393

(22) Filed: Jul. 31, 1998

(51) Int. Cl.[7] .................................................. G06K 5/00
(52) U.S. Cl. ................................ 705/16; 705/40; 705/41; 235/380
(58) Field of Search ............................... 705/16, 40, 41; 235/380

(56) References Cited

U.S. PATENT DOCUMENTS

| | | | |
|---|---|---|---|
| 5,457,732 | * 10/1995 | Goldberg | 455/31.3 |
| 5,465,206 | * 11/1995 | Hilt et al. | 705/40 |
| 5,590,038 | * 12/1996 | Pitroda | 705/41 |
| 5,739,512 | * 4/1998 | Tognazzini | 235/380 |
| 5,815,657 | * 9/1998 | Williams et al. | 713/200 |
| 5,862,223 | * 1/1999 | Walker et al. | 380/25 |
| 5,915,022 | * 6/1999 | Robinson et al. | 380/24 |

* cited by examiner

Primary Examiner—Allen R. MacDonald
Assistant Examiner—Jagdish Patel
(74) Attorney, Agent, or Firm—John C. Moran

(57) ABSTRACT

Transmitting via email by a store computer controlling a point of service terminal (POS) terminal, at which a transaction has been performed, transaction data to a personal computer of a customer making the transaction. The transaction data includes the actual items purchased with price and the grocery code of each item. The transaction data is transmitted as an email message via the Internet. The communication address of the customer computer is identified to the store computer by a store card that is utilized for other purposes or through the use of a standard credit card.

6 Claims, 3 Drawing Sheets

COMMUNICATION OF TRANSACTION DATA VIA THE INTERNET

TECHNICAL FIELD

This invention relates to the communication of transaction data from the site of a transaction to a personal computer of one of the parties to the transaction and more particularly, to the transmission of the transaction data via the Internet.

BACKGROUND OF THE INVENTION

One of the problems experienced by individuals in trying to keep accurate records is the problem of capturing and storing data into a computer spreadsheet program or some other type of computer program. This problem is increased by the retail stores that sell a wide variety of goods under one roof. For example, large stores may sell groceries, pharmaceuticals, clothing, sporting equipment, furniture, etc. The result is that even when an individual has retained the credit card receipt or entered the total amount in a check book register at such a store, a single purchase may include a number of categories for an individual's budget. At present, there are two ways of handling this problem. The first is to retain the sales receipt and manually enter each item on the sales receipt into the proper category of a spreadsheet program. This is a laborious and error prone method. The end result is that the vast majority of people do not maintain accurate personal or business records for their transactions. The reason is simply that a single trip to a large store will result in the purchase of items that may fall into five or more different categories of a budget requiring a large amount of manual processing.

The second way of handling this problem is through the use of a smart card. The smart card stores transaction data that is received from a point of sale (POS) terminal (also referred to as a cash register) at the conclusion of a transaction at the POS terminal. A personal computer later retrieves these categories and associated information from the smart card and inserts the information into a spreadsheet. The problem with the use of a smart card is that it requires a special input/output device on the POS terminal as well as the personal computer. Further, the smart card represents a sizable investment and is yet another card that must be carried in an individual's billfold or purse.

With respect to groceries, many individuals wish to maintain an inventory of the groceries that they have in their home. This has become possible through the advent of special computers for the kitchen which include a grocery code scanner. When an individual removes a can of peas from the storage cabinet, they scan this can of peas before using it, and the computer automatically subtracts the can of peas from the grocery inventory. Unfortunately, at the present time the only way to add items to the inventory is to manually scan each item before storing in a storage cabinet. Most individuals after grocery shopping are simply anxious to put away the items and be done with what in general is an unpleasant task. Hence, very few people are able to maintain an accurate inventory.

SUMMARY OF THE INVENTION

The foregoing problems are solved and a technical advance is achieved by a method in which a store computer controlling a point of service terminal (POS) terminal, at which a transaction has been performed, automatically transmits via email transaction data to a personal computer of a customer making the transaction. The transaction data includes the actual items purchased with price and the grocery code of each item. The transaction data is transmitted as an email message via the Internet. Advantageously, the communication address of the customer computer is identified to the store computer by a store card that is utilized for other purposes or through the use of a standard credit card.

These and other features and advantages of the invention will become apparent of the following description of an illustrative embodiment of the invention considered together with the drawing.

DETAILED DESCRIPTION

Figure 1:
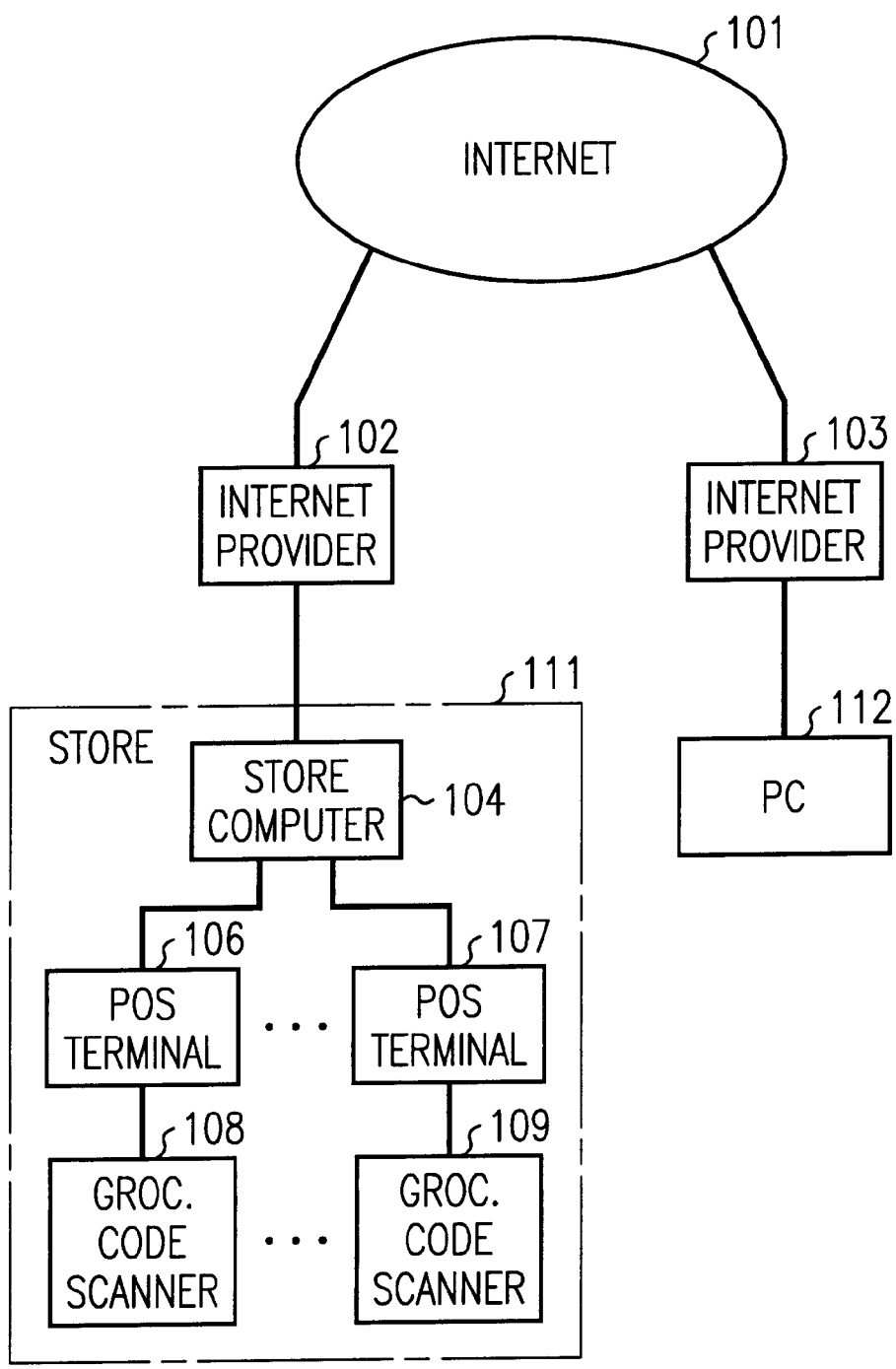
FIG. 1 illustrates a system, in block diagram form, for implementing the invention.

FIG. 1 illustrates a system for implementing the invention. Store 111 has store computer 104 that controls POS terminals 106–107. Attached to each POS terminal is a standard grocery code scanner, such as grocery code scanner 108. The grocery code scanners are well known in the art and have been in use for a number of years. Store computer 104 can transmit email to personal computer (PC) 112 via Internet Providers 102 and 103 and Internet 101. One skilled in the art could readily see that store computer 104 could directly transmit over the public telephone network email messages to a computer on which PC 112 had an email account without the utilization of Internet 101. In addition, other data transport systems could be utilized in place of Internet 101 and Internet providers 102 and 103. During the purchasing of goods, store computer 104 has access to all items, prices, and bar codes that are being purchased at a POS terminal. The customer is identified to store computer 104 by a store club card given to the customer by the store. The store club card is utilized to automatically obtain discounts on purchased groceries. An example of such a store card is the Safeway Club Card that is issued by Safeway Inc. of Pleasanton, Calif. This card has a grocery bar code printed on it that is assigned to the customer. Advantageously, the customer is already utilizing the store club card for other purposes and does not have to carry a separate card to implement the invention.

In operation, the customer had previously submitted to the store the email address of PC 112. After a transaction is complete, store computer 104 transmits an email message to PC 112. This email message is stored on Internet Provider 103 which is the Internet Provider for PC 112. The transaction data can then be retrieved at some later point in time by PC 112 either under manual control of the customer or PC 112 can be set up to automatically check for email messages that contain transaction data. Once the transaction data is retrieved from Internet Provider 103, PC 112 utilizes the transaction data to update aspreadsheet or other program which reflects the customer budget and to update the grocery inventory if groceries were purchased from store 111. One skilled in the art could readily see that there could be a plurality of stores.

Advantageously, rather than using a store club card, the customer could register with the store their personal credit cards along with the email address of PC 112. When store computer 104 received credit card information from a POS terminal, it automatically determines if the credit card number has an associated email address. If there is an associated email address, store computer 104 transmits the transaction data to that email address. Of course, store computer 104 also utilizes the credit card number to process the transaction for payment in a standard manner.

Figure 2:
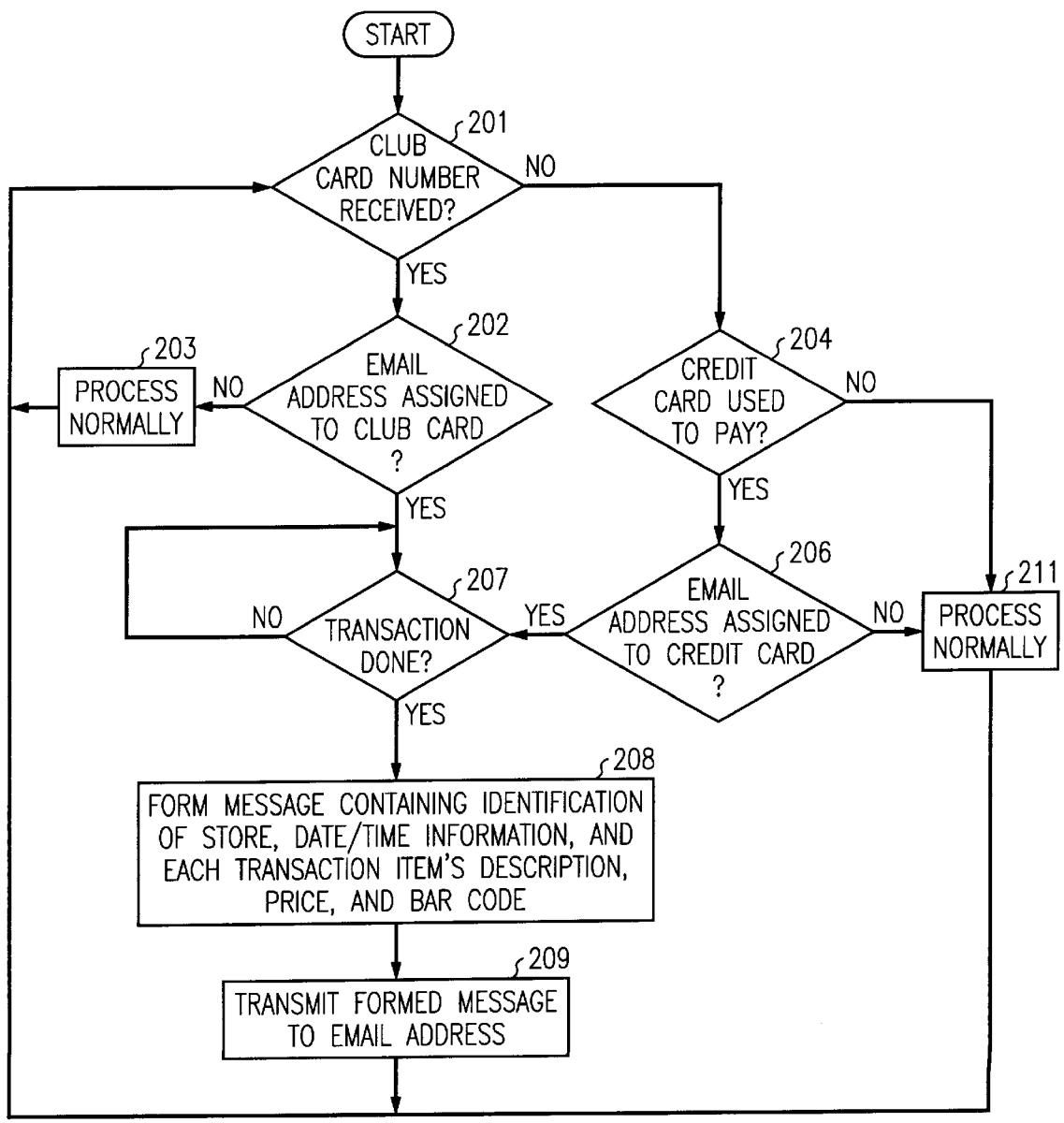
FIG. 2 illustrates, in flow chart form, steps performed by a computer within a store in implementing the invention.

FIG. 2 illustrates, in flowchart form, the operations performed by store computer 104. For ease of description, it is assumed that all operations are being performed by POS terminal 106. Decision block 201 determines if a club card has been read by POS terminal 106 via grocery code scanner 108 which would read the barcode from the club card. If the answer is yes, decision block 202 determines if an e-mail address has been assigned to this club card. The customer owning the club card would have filled out the necessary forms so that store computer 104 would have a record of the e-mail address. One skilled in the art could readily see that there could be a plurality of stored computers within a metro area with a common database that would store all of the club card numbers which store computer 104 would communicate with to perform the operations of decision block 202. Alternatively, store computer 104 could have a copy of all such information. Decision block 202 obtains the e-mail address in addition to making the decision. If the answer in decision block 202 is no, block 203 performs normal processing before returning control to decision block 201. If the answer in decision block 202 is yes, decision block 207 waits until the transaction is completed before transferring control to block 208. Block 208 forms a message containing the identification of the store, the date and time of the transaction, and for each item in the transaction the description, price and barcode (as a number). After execution of block 208, control is transferred to block 209 which transmits the formedmessage to the e-mail address.

Returning to decision block 201, if the club card number has not been received, decision block 204 determines if a credit card was utilized to pay for the transaction. One skilled in the art could readily see that debit cards could also be utilized. If the answer is no in decision block 204, control is transferred to block 211 which performs normal processing before returning control to decision block 201. If a credit card has been used, control is transferred to decision block 206 which determines if an e-mail address has been assigned to the credit card. The customer would have had to fill out the necessary forms designating those credit card numbers which would have an e-mail address associated with them. If the answer in decision block 206 is no, control is transferred to block 211 whose operations have already been described. If the answer is yes in decision block 206, control is transferred to blocks 207–209 whose operations have already been described.

Figure 3:
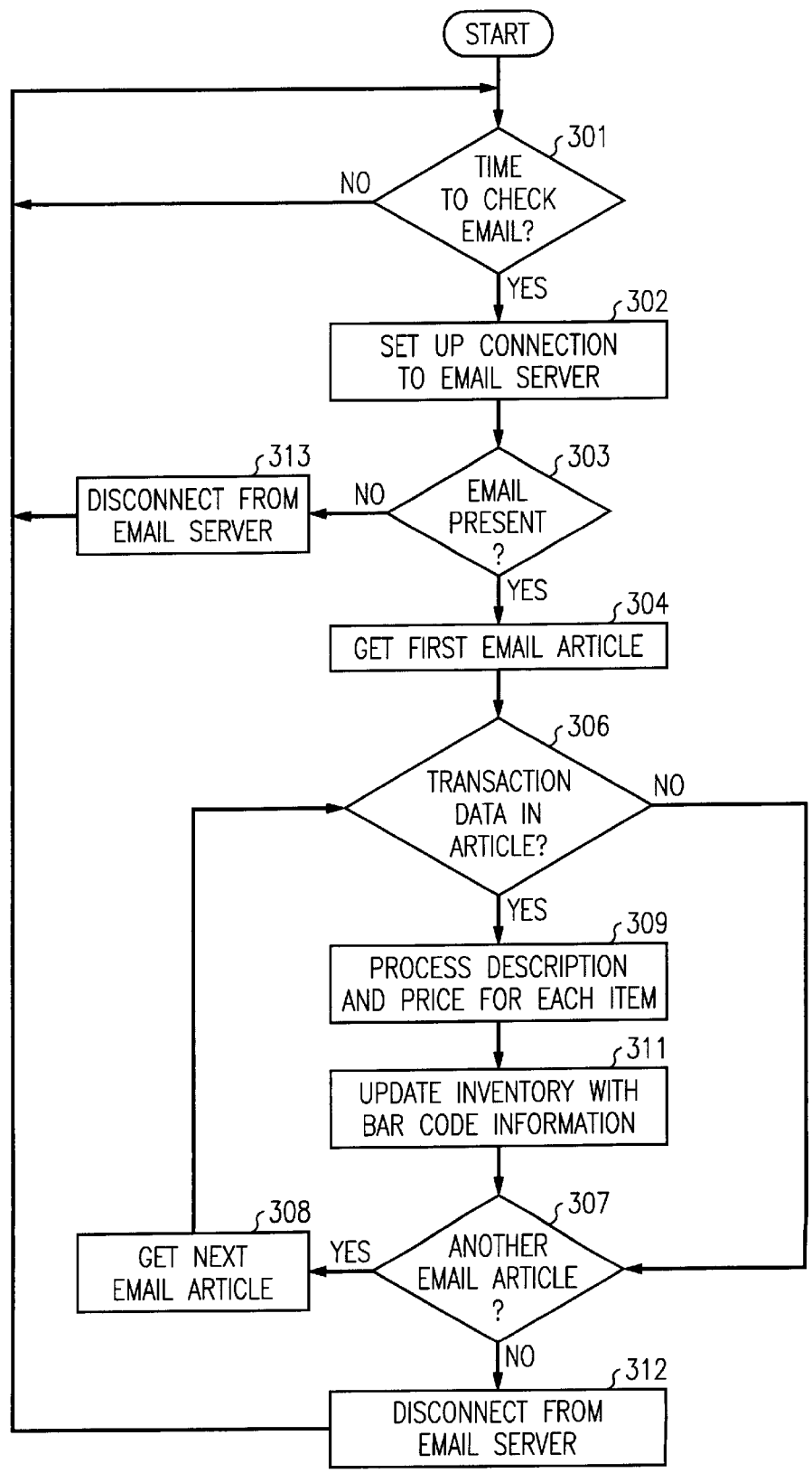
FIG. 3 illustrates, in flow chart form, steps performed by a personal computer in implementing the invention.

FIG. 3 illustrates, in flowchart form, steps performed by a PC in implementing the invention. For ease of description, the following is presented in terms of PC 112. The steps illustrated in FIG. 3 perform an automatic accessing of e-mail so as to obtain transaction data. Once started, decision block 301 determines if it is time to check for e-mail. If the answer is yes, block 302 sets up a connection to the e-mail server for PC 112 this would be Internet Provider 103. After the connection has been established, decision block 303 determines if there is e-mail present. If the answer is no, block 313 disconnects from the e-mail server and transfers control back to decision block 301. If the answer is yes in decision block 303, block 304 accesses the first e-mail article before transferring control to decision block 306. Decision block 306 determines if there is transaction data in the article. If there is transaction data in the e-mail article, this means that it is e-mail from store computer 104 or another store. If the answer is yes in decision block 306, block 309 processes the description and price for each item in the transition data. U.S. Pat. No. 5,559,313 discloses how such transaction data could be utilized and processed by PC 112. After execution of block 309, block 311 updates the inventory of groceries if barcode information is present in the transaction data before transferring control to decision block 307.

Decision block 307 determines if there is another e-mail article present. If the answer is no, block 312 disconnects from the e-mail server before transferring control back to decision block 301. If there is another e-mail article, control is transferred to block 308 which gets the next e-mail article before transferring control back to decision block 306. If decision block 306 determines there is no transition data in an e-mail article, control is transferred to decision block 307 whose operation has already been described.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims.

What is claimed is:

1. A method of transferring barcode data for each purchased article in a transaction from a point of service terminal to a customer computer with the point of service terminal being controlled by a store computer, comprising the steps of:

determining an identification of a communication address of a customer computer with the communication address being encoded as a bar code on a store card with the store card being provided to the customer for other purposes than just identifying the communication address of the customer computer;

reading the barcode data of each article of the transaction to form transaction data of the transaction;

forming the transaction data of the transaction into message;

transmitting the formed message to the customer computer using the communication address; and updating an inventory of articles stored on the customer computer by the customer computer using the barcode data for each purchased article of the transmitted message.

2. The method of claim 1 wherein the step of determining comprises the step of reading the store card by the point of service terminal.

3. The method of claim 2 wherein the formed message is transmitted via the Internet to an Internet provider providing an account for the customer with the email account being identified by the communication address.

4. The method of claim 3 wherein the formed message is an email message.

5. The method of claim 4 further comprises the step of accessing the email message from the Internet provider by the customer computer to obtain the transaction data.

6. The method of claim 5 wherein the step of accessing is performed automatically by the customer computer.

* * * * *